United States Patent
Jeandel et al.

(10) Patent No.: US 12,311,596 B2
(45) Date of Patent: May 27, 2025

(54) THREE-DIMENSIONAL PRINTING DEVICE FOR A SMALL GLASS OBJECT

(71) Applicants: UNIVERSITÉ DE LORRAINE, Nancy (FR); CENTRE EUROPEEN DE RECHERCHES ET DE FORMATION AUX ARTS VERRIER (CERFAV), Vannes-le-Châtel (FR)

(72) Inventors: Gérard Jeandel, Heillecourt (FR); Marie-Alice Skaper, Praye (FR); Denis Garcia, Maron (FR); Simon Aufranc, Vandoeuvre les Nancy (FR); Guilherme Vianna-Santos, Vandoeuvre les Nancy (FR); Damien Brissinger, Chaligny (FR)

(73) Assignees: Université de Lorraine, Nancy (FR); CENTRE EUROPEEN DE RECHERCHES ET DE FORMATION AUX ARTS ARTS VERRIERS (CERFAV), Vannes-le-Chatel (FR)

( * ) Notice: Subject to any disclaimer, the term of this patent is extended or adjusted under 35 U.S.C. 154(b) by 774 days.

(21) Appl. No.: 17/435,216

(22) PCT Filed: Feb. 25, 2020

(86) PCT No.: PCT/EP2020/054945
§ 371 (c)(1),
(2) Date: Aug. 31, 2021

(87) PCT Pub. No.: WO2020/178081
PCT Pub. Date: Sep. 10, 2020

(65) Prior Publication Data
US 2022/0143908 A1    May 12, 2022

(30) Foreign Application Priority Data
Mar. 1, 2019 (FR) ..................................... 1902127

(51) Int. Cl.
*B29C 64/153* (2017.01)
*B23K 26/34* (2014.01)
(Continued)

(52) U.S. Cl.
CPC ............ *B29C 64/153* (2017.08); *B23K 26/34* (2013.01); *B29C 64/268* (2017.08); *C03B 19/06* (2013.01);
(Continued)

(58) Field of Classification Search
CPC ................................ B33Y 10/00; B33Y 30/00
See application file for complete search history.

(56) References Cited

U.S. PATENT DOCUMENTS 5,182,715 A * 1/1993 Vorgitch ................ B33Y 10/00
264/401
6,815,636 B2 11/2004 Chung et al.
(Continued)

FOREIGN PATENT DOCUMENTS

EP    2292357 A1    3/2011
EP    2784045 A1    10/2014
(Continued)

OTHER PUBLICATIONS

Schwager et al., "Manufacturing of three dimensional silicate moldings by selective laser beam sintering", Proc. of SPIE vol. 10448, 2017, pp. 1044824-1 to 1044824-8. (Year: 2017).*
(Continued)

*Primary Examiner* — Lisa L Herring
(74) *Attorney, Agent, or Firm* — FISHERBROYLES, LLP; Roger L. Browdy; James E. Mrose

(57) ABSTRACT

A device is provided for three-dimensional printing of a glass object, by applying and solidifying successive layers of a material constituting the glass, in locations corresponding to the section of the object to be produced in the
(Continued)

corresponding layer, by a laser producing a beam whose wavelength allows the direct fusion in the core of the material. The device includes a supply mechanism for supplying the material to a support on which the successive layers are formed: a thermal regulator of the successive layers for holding their temperature during the production of the object and for cooling them after the production of the object; and a central unit controlling the laser. The printing device includes a servo-control for servo-controlling the power and the speed of the laser in real time.

9 Claims, 2 Drawing Sheets

(51) Int. Cl.
*B23K 103/00* (2006.01)
*B29C 64/268* (2017.01)
*B33Y 10/00* (2015.01)
*B33Y 30/00* (2015.01)
*C03B 19/06* (2006.01)

(52) U.S. Cl.
CPC ........... *B23K 2103/54* (2018.08); *B33Y 10/00* (2014.12); *B33Y 30/00* (2014.12)

(56) References Cited

U.S. PATENT DOCUMENTS

| 2005/0074550 | A1* | 4/2005 | Leuterer | B33Y 40/00 |
| | | | | 118/308 |
| 2017/0282455 | A1* | 10/2017 | DeFelice | B29C 64/153 |
| 2018/0237329 | A1* | 8/2018 | Drewnowski | B33Y 10/00 |
| 2019/0270245 | A1* | 9/2019 | Hamers | B22F 12/67 |
| 2020/0391439 | A1* | 12/2020 | Hayashi | G01F 22/00 |
| 2021/0291440 | A1* | 9/2021 | Fleischmann | C09D 11/322 |
| 2021/0291449 | A1 | 9/2021 | Andre et al. | |

FOREIGN PATENT DOCUMENTS

| EP | 2 840 071 A1 | 2/2015 |
| EP | 3042751 A1 | 7/2016 |
| FR | 3 056 593 A1 | 3/2018 |
| WO | 2017027784 A1 | 2/2017 |

OTHER PUBLICATIONS

Yeung et al., "Laser Path Planning and Power Control Strategies for Powder Bed Fusion Systems", Solid Freeform Fabrication 2016: Proc. of the 27th Annual International Solid Freeform Fabrication Symposium, An Additive Manufacturing Conference, pp. 113-127. (Year: 2017).*

Zhang et al., "Processsing Parameters for Selective Laser Sintering of Melting of Oxide Ceramics", Additive Manufacturing of High-performance Metals and Alloys—Modeling and Optimization. InTech. Available at: http://dx.doi.org/10.5772/intechopen.75832 (Jul. 11, 2018), pp. 90-124. (Year: 2018).*

Schwager A-M et al. "Production of glass filters by selective laser sintering" Proceedings of SPIE; {Proceedings of SPIE ISSN 0277-786X vol. 10524], SPIE, US, pp. 106750P-106750P, vol. 10675, (May 22, 2018).

Shi Ce et al. "CO and CO laser comparison of glass and ceramic processing" Proceedings of SPIE, SPIE, vol. 10911, pp. 1-20, (Feb. 27, 2019).

Kruth, et al., Additive Manufacturing of Metals via Selective Laser Melting Process Aspects and Material Developments, Additive Manufacturing: Innovations, Advances, and Applications, pp. 69-100, 2015.

* cited by examiner

10# THREE-DIMENSIONAL PRINTING DEVICE FOR A SMALL GLASS OBJECT

TECHNICAL FIELD OF THE INVENTION

The invention relates to a device for three-dimensional printing of a small glass object. The invention also relates to a printing method for the three-dimensional printing of such an object.

The 3D printing techniques or three-dimensional printing commonly used are based on the principle of additive manufacturing. Objects are created by forming successive layers.

BACKGROUND

For the production of small objects, devices are known for the three-dimensional (3D) printing of an object in a polymer material, for example plastic, with a relatively low fusion temperature, for example between 100° C. and 300° C. These devices allow to manufacture small and complex shaped objects, i.e. with cavities, particular angles, counter shapes, etc. These devices use several techniques, namely printing by deposition of molten matter, or printing by projection of binder on a bed of powder, or printing by laser sintering.

However, these printing devices are not adapted to manufacture these same objects of glass material. Indeed, the glass has a much higher fusion temperature, for example between 1000° C. and 2000° C., and a glass transition temperature between 300° C. and 800° C. It also has physical, chemical and thermal properties that are quite different from those of the polymers. In the case of laser sintering impression, the laser used for 3D printing of a plastic object does not have the right characteristics (power, wavelength, etc.) to be used for the 3D printing of a glass object. This is because the wavelength of the laser differs from the absorption spectrum of the glass, which depends in particular on the composition of the glass. The wavelength of the selected laser must match with the absorption spectrum of the material chosen to form the final object.

In order to print a 3D glass object, it is known from the document EP 3 042 751 to use a heated print head, in which glass filaments are fed which will heat up in the head, and this molten glass is then dispensed via an outlet nozzle which deposits successive layers of molten glass according to the desired pattern.

The disadvantage with this type of device is the lack of precision of the glass castings. The resulting object will have relatively simple shapes, with a low level of detail, and will always be a few centimeters in size, with a resolution limited by the size of the nozzle. However, a nozzle can never have a spatial resolution of micrometer or less, since it has an outlet orifice with a diameter that must be large enough to avoid any obstruction or overpressure.

In an attempt to achieve a greater accuracy, it is known from the document FR 3 056 593 to use a two-photon photopolymerization technique. This method uses the glass in the form of beads as a filler in a monomer polymerized by the two-photon method. This technique allows to produce objects of great complexity with a high degree of finish, i.e. spatial resolution, which can be in the nanometer range. However, this technique is relatively complex to implement.

The document EP 2 784 045 uses a laser for a sintering or a fusion to form a ceramic or bio-glass object, i.e. a compound comprising SiO2. The material can therefore be transparent, which is problematic for the laser. The idea is therefore to use a vector to obtain an indirect fusion of the transparent powder material. This vector is an additive, such as carbon, which will modify the absorption spectrum of the material, to allow greater suppleness in the choice of the wavelength of the laser. The disadvantage is that the final object will contain carbon particles, and will not be pure glass without additives.

SUMMARY OF THE INVENTION

The aim of the present invention is to overcome the various disadvantages set out above, by means of a device for three-dimensional printing of an object made of glass, which is capable of producing objects of a high precision, with details smaller than one millimeter, and which can have complex shapes, nested shapes and undercuts, with a density close to that of a material which does not comprise porosity, and all this with an industrial reproducibility.

The printing device according to the invention prints a glass object by applying and solidifying successive layers of a material constituting the glass, in locations corresponding to the section of the object to be produced in the corresponding layer, by means of a laser.

The laser technology is used here to achieve a selective and precise fusion of the material to form the 3D objects. The laser is also particularly interesting for its speed of execution.

This device comprises:
  means for supplying the material to a support on which the successive layers are formed;
  means for thermal regulation of the successive layers for holding their temperature during the production of the object and for cooling them after the production of the object;
  a central unit controlling the laser.

The laser produces a beam whose wavelength allows the direct fusion of the material in its core.

By direct fusion of the material in its core, it is meant in the sense of the invention that no energy vector is added to the material in order to perform a two-step fusion, i.e. to fuse said vector, for example metallic nanoparticles, with the aid of the laser, and then to fuse the glass containing this energy vector by simple thermal conduction. The invention thus allows a direct fusion of a glass whose composition does not include any material whose sole function would be that of an energy vector described above.

The glass used according to the invention may comprise one or more additives and/or catalysts, other than those used as a simple energy vector.

The invention is mainly characterized in that said printing device comprises means for servo-controlling the power and the speed of the laser 8 in real time.

These servo-control means are an asset in the managing of the temperature of the object as it is created. In fact, they allow to control the temperature of the fusion layer, in real time, at each point of the pattern to be produced. If a point is not sufficiently heated, then the servo-control means identifies it, and instructs the laser to slow down its path to spend more time on that point, and/or to increase the power of the beam to increase the temperature on that precise point. Conversely, the servo-control means can instruct the laser to accelerate its path or decrease the power of the laser beam, if a point is overheated. This real time control allows the porosity of printed objects to be greatly reduced. Without this control, pores can form where the laser does not spend enough time, or is not powerful enough, and the matter is not properly fused. The control of the fusion at any point of the object to be printed allows to improve the homogeneity of its final surface state.

Advantageously, said thermal regulation means are controlled by the central unit and hold the layers of the object at a holding temperature comprised between the glass transition temperature of the material (Tg) minus 100° C. and the softening temperature of the material (Tr). The glass is a non-crystalline solid that has a glass transition (Tg). The latter corresponds to the transition from a solid state to a viscous liquid state. The glass transition temperature (Tg) that characterizes it corresponds to a range of temperatures during which this transition occurs. It can be measured at the beginning, the middle or the end of the transition. In our case, the temperature at which the glass transition begins will be used for the Tg value.

The softening temperature (Tr) is the temperature at which the initially solid material starts to soften. It occurs after the beginning of the glass transition.

The idea behind the invention is to find a suitable laser whose beam is sized to penetrate the entire layer of matter to be treated. This is because the radiation must not be absorbed as soon as it enters the matter. It must be able to penetrate the matter to allow the fusion in the core of the matter. The laser must be able to deliver the right amount of energy, in a very limited space, at the right time. The layer of matter is fused when its temperature exceeds the glass transition temperature (Tg) of the matter and reaches the fusion temperature of the matter.

With a laser of the chosen wavelength, the penetration rate of the radiation is optimal in order to fuse the glass and avoid residual mechanical stresses induced by excessive temperature gradients, as will be explained below.

The wavelength of the laser must be adapted to the absorption spectrum of the glass. It must be in a wavelength range where the glass is sufficiently absorbent to reach its fusion temperature, while limiting the transmission through the glass, in which case the laser would pass through the matter without fusion.

Preferably, the printing is carried out using a laser whose wavelength is chosen in the infrared range so that the beam is absorbed along its path in the part, and whose optical power is adjustable.

In a preferred embodiment of the invention, the laser used is a CO (Carbon Monoxide) cavity laser, with a wavelength between 1 and 12 µm and an adjustable optical power up to 150 W.

Alternatively, the printing is produced with a UV (Ultra Violet) laser, with other wavelength ranges adapted to the absorption spectrum of the glass.

The main difficulty lies in the regulation of the temperature of the object as it is created, layer by layer. The laser power must be high enough to heat the material layers. However, it is necessary that the gradient remains low to avoid the breakage of the object during its creation, or after its creation. By gradient is meant variation of temperature in the space.

In this case, during the creation of the object, it is the temperature difference between the fusion point and the adjacent points on the sides and below that should not fuse. This temperature difference is minimal and must be managed with precision.

During the cooling of the object, it is the temperature variation between two end points of the object, for example, or between a point in the core of the object and a point on the surface. This gradient must be minimal, so that the cooling is homogeneous within the object.

The control of the temperature allows to form 3D glass pieces with sufficient mechanical strength to grip them, with complex geometric functions and which can be nested, following a predefined 3D computer model.

According to a possible embodiment, said thermal regulation means comprise a heating system of the support heating the first layer, each layer n being heated indirectly by contact with the lower layer n-1.

In this case, the first layer of material applied to the support must first be heated to a temperature close to the glass transition temperature of the material so that it fuses on the support. This first layer constitutes the pedestal of the object. The laser is activated to finalize this fusion.

Then, the subsequent layer is deposited on the first layer, and is thus preheated via the contact with the first layer to said holding temperature, and then the laser is activated to fuse the concerned area.

And so on, each new layer is pre-heated by the previous layer, before the laser is activated.

The support always remains warm, to guarantee the general holding temperature of the object. In the end, all the layers are kept at temperature as the object is created.

In general, the first layer is thermally treated via the heating support to allow the volume to be implanted and then each layer is added and fused by minimizing the temperature gradients from one thickness to the next. The thermal environment is controlled in the temperature range between the Tg of the glass minus 100° C. and the softening temperature Tr.

This limitation of the gradient allows the object to become more resistant, and thus to improve its long-term mechanical properties.

Preferably, the support is equipped with an induction heating system. Any other type of heating can be used.

Alternatively or additionally, said thermal regulation means comprise a system for heating the ambient air around the object. For example, a radiative heating system is placed above the printing area. This heating system allows the object to be heated from above at a distance, while the support allows the object to be heated from below in direct contact. By combining the two heating systems, the overall temperature of the object can be homogenized.

This radiative heating system is fixed in relation to the support.

Advantageously, this radiative heating system is retractable. This means that it can be mobile in relation to the support, so that it can be moved away from or close to the object being created, in order to best adapt the temperature holding of the object.

This radiative heating system can have a variable thermostat, just like the induction heating system.

This double heating system (via the support and via the environment) allows to refine the temperature of the object being created, in order to limit as well as possible the differences in temperature between the lower part and the upper part of the object.

Advantageously, the object is created in a thermal enclosure forming a chamber inside which the temperature is homogeneous and controlled. This enclosure is isolated from the outside.

The choice of the laser, associated with the limitation of the temperature gradient, allows to manufacture small glass objects with a dense and smooth surface appearance and long-term resistance.

The laser beam is focused on the printing area by means of a convergent optic. The working distance between the laser and the printing support affects the focus point. The beam intensity has a Gaussian shape at the beam waist, which implies that the intensity received at the surface of this beam waist is directly related to the resolution of the printing.

The laser path is modelled according to the object to be printed. This modelling is usually performed via an electronic board and a specific software, which is part of the central unit.

Preferably, the servo-control means comprises a brightness sensing and measuring device which senses and measures the light produced in the vicinity of the fusion point and transmits information to the central unit. The light produced by the fusion point is captured by the brightness sensing and measuring device, then analyzed by the treating means, which then send commands to the laser to adjust its power and its speed accordingly. These servo-control means thus allow to improve the homogeneity of the fusion bath induced by the laser.

More precisely, this sensor measures the radiation emitted by the object being produced. Based on the radiation emitted by the fusion point, it is possible to deduce the temperature of the object in the fusion area.

Advantageously, a calibration of the brightness sensing and measuring device is carried out before the start of the printing.

According to a possible embodiment, the beam of the laser reaches said locations corresponding to the section of the object to be produced in the corresponding layer, by means of a set of orientable mirror or orientable mirrors controlled by the central unit and deflecting the outgoing rays of the laser in the direction of the location to be aimed at. These mirrors allow the entire printing area to be scanned.

The laser remains fixed.

The orientable mirrors, thus mobiles, are placed in the optical path of the laser beam to direct the beam to the locations provided according to the model of the path of the laser.

The orientation of the mirrors is controlled by the software and the associated electronic board, thanks to which the path of the laser is modelled.

In general, any other system allowing to direct the laser beam in the x, y and z directions is suitable in the scope of this invention.

According to a possible embodiment, the means for supplying the material consists of a glass powder distributor adapted to pour a dose of matter over the entire surface forming the support in the initial phase, and then over each fused layer.

A powder bed type system is therefore used. This powder bed system is adapted to the abrasive nature, the hardness, the granulometry of the powder used, and the temperatures employed.

This powder is, for example, made up of glass beads, each bead preferably having a size of less than 100 μm.

It may be established glass powder, or it may be powder whose composition contains glass precursors.

The composition of the glass used is adapted to the properties required for the final object. The main component of the glass can be the silica. For example, the glass can be soda-lime, boron-lime, bio-glass, etc. The physical-chemical, thermal and mechanical properties differ depending on each type of glass. Depending on the type of glass chosen, it is necessary to adapt the parameters of the printing method: wavelength, power density, speed.

According to a possible embodiment, the support is vertically mobile with respect to a horizontal work table of the device, said support being located at the same level as the work table when the first layer of material is applied, and then descends by one notch after each layer formation, the height of one notch corresponding to the thickness of the layer formed so that the next application of material is performed on a work surface located at the same level as the work table.

Indeed, after the treatment of a layer, the support descends by a predefined distance corresponding to the thickness of a layer and the process is repeated for each layer, thus allowing the complete 3D structure of the object to be obtained.

Alternatively, the supply means of the material may consist of a conventional distributor of a glass yarn, which unwinds from a spool along the printing.

Other means for supplying the material can be envisaged, such as powder spraying, or other.

The printed object has complex forms, nested and undercut forms. Preferably, the object has a spatial resolution of less than one millimeter.

These small glass objects can be used in medical applications for example, using bioactive glass for biomedical purposes. Or, it is possible to produce small glass channels for micro-fluidic applications for example.

It is also possible to consider the realization of thin glass layers deposits on complex structures.

This printing device can also be used, for example, to repair glass objects, or to recharge a glass object.

After shaping, the glass object generally requires an annealing, which corresponds to a holding in temperature at a temperature that is characteristic of the composition of the glass used. After this annealing, the glass object requires a progressive cooling according to a curve depending on its composition and its mass. If the cooling is too rapid, it causes high stresses in the matter with heterogeneous contractions.

To control the temperature of the object during the cooling, the device comprises a temperature sensor, of the thermocouple type, measuring the temperature of the object by direct contact. This thermocouple sends its measurements in real time to the central unit, which sends orders to the heating systems so as to ensure that the temperature of the object during the cooling follows the curve of the predefined thermal cycle as closely as possible.

The invention also relates to a printing method for printing a glass object in three dimensions by means of a printing device as described above, characterized in that it comprises the following steps:
 a) checking the position of the support, which must be at the same level as that of a work table;
 b) heating the support to the holding temperature;
 c) applying a first layer of material to the support;
 d) fusing the first layer of the material by the laser under supervision of servo-control means of the laser;
 e) descending the support by one notch;
 f) applying an additional layer of material over the previous layer;
 g) fusing the additional layer of the material by the laser under the supervision of the servo-control means of the laser;
 h) descending the support by one notch;
 i) repeating the steps f) to h) until the object is completed;
 (j) cooling the object according to a material-specific diagram.

Here are some additional technical details about the servo-control.

During a 3D printing, the fusion area, also called the fusion bath, moves with the movement of the laser beam.

The fusion bath comes therefore constantly into contact with colder matter, such as glass beads, which disrupts the fusion process.

Indeed, on the front and the periphery of the fusion bath, cold glass beads are present and not fused. They are considered to be disruptive and may even cause the laser beam to be reflected or absorbed. At constant laser power, the fusion bath temperature drops significantly. As a result, the fusion bead is not completely homogeneous and this effect impacts the quality of the glass print: in particular the homogeneity of the fusion as well as the optical and mechanical properties of the piece produced.

By means of the brightness sensing and measuring device at the periphery of the fusion bath, e.g. an optical sensor arranged above the fusion bath, the power of the LASER beam can be calculated synchronously with respect to the light intensity of the fusion bath.

The servo-control means consist of a brightness control system, which functions as follows.

The brightness control system operates in a closed loop with respect to a desired light intensity and provides a power adjustment to control the laser.

This brightness control system comprises the brightness sensing and measuring device which is based on the optical sensor, for example of the LDR (Light Dependent Resistor) type, as well as an instrumentation electronics for conditioning the measured signal. This measured signal arrives at the level of a brightness controller, which belongs to the central unit. The brightness controller therefore receives signals at the input that allow it to determine the measured light intensity.

In general, the control electronic board of the printer provides the signals to drive the laser, as explained earlier in the description. These signals, before going directly to the laser, will pass through this same brightness controller. The latter therefore also receives signals at the input allowing it to determine the desired light intensity.

This brightness controller analyses and compares the signals emitted from the optical sensor and the control board. According to the measured difference between the signals, it will adjust in real time the power and the speed of the laser and control them, in order to control the fusion in progress.

BRIEF DESCRIPTION OF FIGURES

Further characteristics and advantages of the invention will become apparent from the following detailed description, for the understanding of which reference is made to the single attached drawing in which.

DETAILED DESCRIPTION OF THE INVENTION

Figure 1:
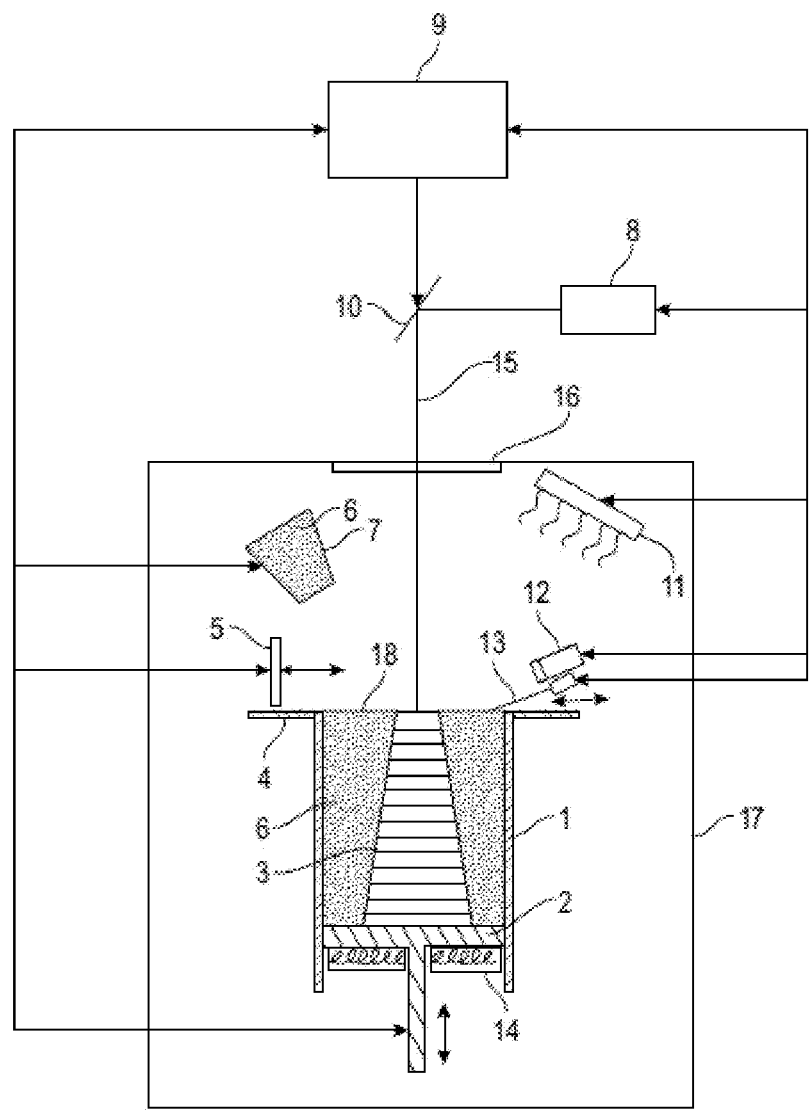
FIG. 1 is a schematic view of a device for three-dimensional printing of a glass object according to the invention.

The printing device as illustrated in FIG. 1 comprises a container 1 open at the top and comprising a vertically movable support 2. This support 2 is intended to support the object 3 to be formed and defines a printing area.

This support 2 is arranged at a certain height so that each layer being solidified rests on a work surface 18 integrated in a surface of a work table 4 having an opening at the level of the container 1. The container 1 is arranged under the work table 4, so that its upper edge is flush with the work table 4.

More precisely, in the initial phase, the support 2 is arranged flush with the surface of the work table 4. The first layer of the object 3 can be produced directly on the support 2. Then the support 2 descends by one notch, corresponding to the thickness of the first layer produced. The first layer then forms a work surface that is flush with the surface of the work table 4. Then, the second layer of the object 3 can be produced at the level of this work surface 18. And so on.

A distributor 7 for glass powder 6 is arranged above the work table 4. This distributor 7 comprises a reservoir filled with glass powder 6, which is the material used to form the glass object 3.

The distributor 7 initially pours a dose of powder onto the work table 4, and in particular onto the support 2.

Then a brush 5 or a roller performs a horizontal pass over the work table 4 so as to distribute the glass powder evenly on the support 2.

A laser beam 15 is then directed towards the support 2 to cause the fusion glass powder 6 to enter the locations appropriate to the pattern of the first layer of the object 3 to be formed.

Once this first layer is fused, the support 2 descends by one notch, and the distributor 7 pours a new dose of glass powder 6 onto the work table 4, and in particular onto the work surface 18 formed by the previous layer of glass powder 6.

The brush 5 completes its pass, and then the laser beam 15 is switched on again to cause the fusion glass powder 6 to enter the locations appropriate to the pattern of the second layer of the object 3 to be formed.

Once this second layer is fused, the support 2 descends by one notch, and all the above operations are repeated n times, until the object 3 is completed.

The support 2 is preferably made of a non-thermally insulating material, for example metal. The support 2 is mobile in vertical translation, for example by means of cylinders.

Underneath the support 2, a heating system is installed, so that the support 2 is heated to a predefined temperature. In this example, it is an induction device 14. The preset temperature must be close to the glass transition temperature of the glass powder 6, so that the powder 6 is heated and starts to fuse via the support 2.

A second heating system is set up, this time above the work table 4, i.e. above the support 2, so as to heat the upper layer of the object 3 being produced. This reduces the potential temperature difference that may exist between the lower layer of the object 3 and the upper layer of the object. In this example, it is a retractable radiative heating 11.

These heating systems allow the object being created to be held at a holding temperature between the glass transition temperature minus 100° C. and the softening temperature of the glass. Such a holding temperature allows to limit the temperature gradient between the fusion point and the adjacent points. It also allows to limit the temperature gradient during the controlled cooling of the object after its creation.

In order to obtain a homogeneous temperature inside the object 3 being created and outside, the support 2, the work table 4, the distributor 7 and the various heating systems 14, 11 can be positioned within a thermal enclosure 17, thus isolated from the outside. This enclosure 17 defines a chamber in which the temperature is homogeneous at all points. The environment in which the object 3 is built is thus homogeneous from a thermal point of view, and this allows to preheat each powder bed, and each new stratum of the object 3, as it is created, to the desired holding temperature.

The laser 8 is arranged outside the enclosure 17, as it is not designed to withstand such temperatures.

The laser 8 is arranged above the enclosure 17, and emits a beam 15 whose optical path is redirected towards the support 2, via an orientable mirror 10. The different orientations of the mirror 10 allow the beam 15 to follow a precise path on the powder layer in order to make a section of the object 3.

Indeed, the object 3 has been previously modelled using a software, and a central unit (electronic board) controls the movements of the mirror 10 so that the beam 15 follows the path foreseen in the model.

The beam 15 passes through a specific window 16 provided in the upper wall of the enclosure 17. This window 16 may consist of a lens 16 which allows the beam 15 to converge on a precise point at the level of the work surface 18.

The central unit 9 also controls the movements of the brush 5 and the support 2.

In addition, means for servo-controlling the power and the speed of the laser are installed. They comprise an optical sensor 12 that captures the light produced by the fusion point. This sensor 12 is positioned above the support 2, and aims at the area where the object 3 is created.

This optical sensor 12 sends the information to the central unit 9, which processes it, and which then adjusts in real time the power of the laser 8 and its speed, so that the fusion is optimal at any point of the object 3 being created.

Once the object 3 is created, it must be cooled in a certain way, in order to avoid its embrittlement at the time of cooling. The cooling of the object 3 is predefined, and follows a specific temperature curve, with or without threshold, depending on the composition of the glass used.

For this purpose, the device comprises, for example, a thermocouple 13 which is positioned in contact with the object 3 and which measures the temperature of the object 3 during the cooling.

This thermocouple 13 sends the measured temperature to the central unit 9, which then adjusts in real time the various heating systems 14, 11 in order to regulate the temperature within the enclosure 17 and within the object 3, so that it follows the imposed curve.

It is also possible to anneal the object 3, also according to a predefined temperature curve, so as to reinforce its mechanical properties. This annealing is enabled via the heating systems 14, 11, and is controlled by the central unit 9 and the thermocouple 13.

Example of 3D Printing According to the Invention

Figure 2:
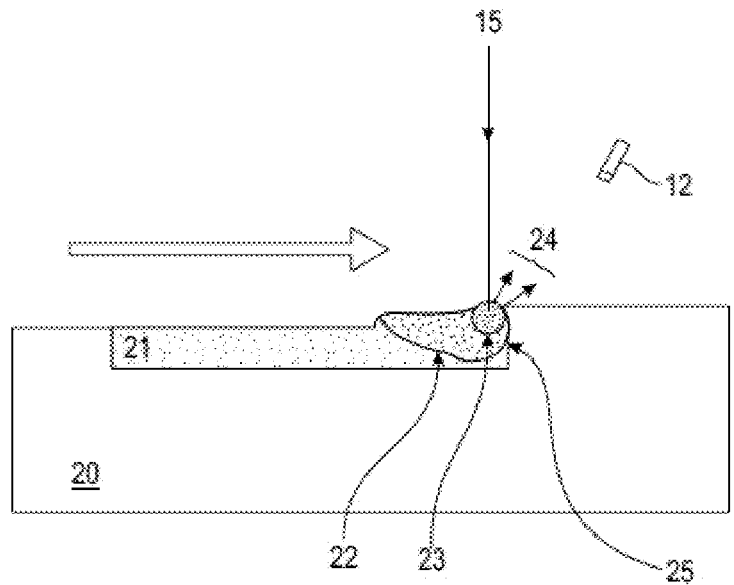
FIG. 2 shows the laser fusion of glass powder.

The 3D printing device according to the invention was able to produce 3D objects with the following parameters:
using soda-lime glass in microbeads
grain size between 100 µm and 200 µm
glass transition temperature Tg of the glass above 500° C.
softening temperature of the glass Tr around 600° C.
holding in temperature at 550° C.
interval between each layer set to 0.6 mm: this interval corresponds to the thickness of one layer for the object 3 and to the height of one notch for the support 2
interval between each passage line of the laser on the printing surface set at 0.7 mm
printing speed of the laser of 15 mm/s
power of the laser beam of 1.6 W
laser type: CO laser
laser wavelength: from 5.6 to 6.2 µm
lens converging in ZnSe arranged in the optical path of the laser beam
control via a minitronics v1.1 type electronic board with embedded software
holding temperature threshold at 550° C., then slow descending in temperature FIG. 2 shows the laser fusion of glass powder.

The glass powder 6 in FIG. 1 is shown here as a thick first layer, to improve the clarity of the diagram, with cold powder areas 20, and hot areas 21-22-23. The beam 15 of the laser is aimed at the upper surface of this glass powder layer, and moves progressively from left to right, according to the large horizontal arrow. To the left, glass is already fused and solid. The closer you get to the fusion point 23 on the right, the hotter the glass becomes. This temperature rise is illustrated by the small points. The more points, the higher the temperature. A fusion bath 22 is visible around the fusion point 23. During the 3D printing, the fusion bath 22 moves with the movement of the laser beam 15. The same applies to the fusion point 23.

There is a contact area 25 between the hot glass of the fusion bath 22 and the cold glass powder 20. The fusion bath 22 comes therefore continuously into contact with cold glass beads 20, which disrupt the fusion process. In fact, the so-called cold glass beads 20 are present on the front and the periphery of the fusion bath 22 and are not fused. They are considered disruptive and can cause the reflection or the absorption of the laser beam 15, as illustrated by the small oblique arrows.

The heat emanating from the fusion point 23 is captured by a brightness sensing and measuring device 12 at the periphery of the fusion. This device 12 corresponds, for example, to the optical sensor. It is arranged above the fusion bath 22 and slightly upstream of the laser beam 15, so as to point to each new fusion area each time the beam 15 advances. It points precisely to the front of the fusion bath 22, which here corresponds to the right side of the fusion bath 22, and which also corresponds to the front of the fusion point 23, since this is also where the reflections of the laser can occur and disturb the fusion. It is therefore essential to know the exact temperature at this point in order to be able to adjust the laser parameters until the desired temperature is reached in the program. The area that fuses takes on a certain color with a certain light intensity depending on its temperature. The sensor senses the light intensity emitted by the fusion bath, so that the actual temperature can be deduced.

Figure 3:
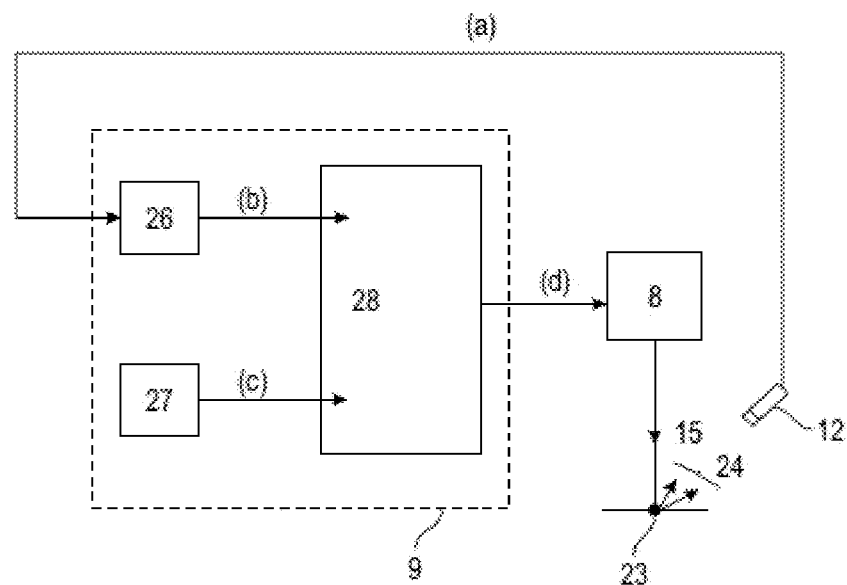
FIG. 3 is a diagram of the brightness control system.

FIG. 3 illustrates schematically the servo-control of the laser.

The brightness sensing and measuring device 12 senses the light emitted from the front of the fusion point 23. It sends this light signal (a) to an instrumentation electronics 26 to condition the measured signal. This electronics 26 allows to convert this signal into a measured brightness data (b) and sends it to a brightness controller 28 which belongs to the central unit 9.

At the same time, the control electronic board 27 of the printer provides data (c) to the brightness controller 28 to control the laser 8. In particular, it sends a desired light intensity data, which is a function of a desired temperature at the front of the fusion bath 22.

This brightness controller 28 analyzes and compares the input data (b) and (c) emitted from the optical sensor 12 on the one hand, and from the control board 27 on the other hand. Based on the measured difference between the data, it will adjust the power of the beam 15 and the speed (d) of the laser 8 in real time and control them at the output, in order to control the ongoing fusion, so that the measured light intensity is as close as possible to the desired light intensity, i.e. the measured temperature is as close as possible to the desired temperature.

The laser 8 therefore sends its beam 15 with a power and a speed controlled in real time.

The brightness control system operates in a closed loop with respect to a desired light intensity (i.e., a desired temperature) and provides a power and speed adjustment to drive the laser 8.

The embodiments shown in the cited figures are only possible examples, in no way limiting, of the invention which, on the contrary, encompasses the variations of shapes and designs within the reach of the person skilled in the art.

The invention claimed is:

1. A device for three-dimensional printing of an object made of glass, by applying and solidifying successive layers of a glass, in locations corresponding to a section of the object to be produced in a corresponding layer, by a laser, said device comprising:
   a supply mechanism for supplying a glass having a non-crystalline solid state to a support on which the successive layers are formed;
   a thermal regulator of the successive layers for holding their temperature during the production of the object and for cooling them after the production of the object;
   an infrared or UV laser;
   a central unit programmed to control the laser to cause the application and solidification of the successive layers and programmed to control the thermal regulator to cause the holding in temperature of the successive layers;
   said laser producing a beam whose wavelength allows the direct fusion of the glass having a non-crystalline solid state, in its core, said printing device further comprising a servo-control for servo-controlling the power and speed of the laser in real time,
   wherein said thermal regulator comprises:
      a heating system of the support heating the first layer of the successive layers, each successive layer of the successive layers n being heated by contact with a lower layer n-1;
      a system for heating ambient air around the object,
   the thermal regulator being configured to hold the layers of the object at a holding temperature comprised between the glass transition temperature of the glass (Tg) minus 100° C. and the softening temperature of the glass (Tr) so as to limit temperature gradients between a point of the direct fusion of the glass in its core and other points of the object, during the direct fusion and during controlled cooling of the object after its creation.

2. The printing device according to claim 1, wherein the servo-control comprises a brightness sensing and measuring device sensing and measuring a light produced in a vicinity of a fusion point and transmitting information to the central unit.

3. The printing device according to claim 1, wherein the beam of the laser reaches said locations corresponding to the section of the object to be produced in the corresponding layer, by a set of orientable mirrors controlled by the central unit and deflecting the outgoing rays of the laser in the direction of a location to be aimed at.

4. The printing device according to claim 1, wherein the supply mechanism for supplying the glass consists of a distributor of glass powder adapted to pour a dose of matter onto the entire surface forming the support in the initial phase and then onto each fused layer.

5. The printing device according to claim 1, wherein the support is mobile in vertical translation with respect to a horizontal work table of the device, said support being situated at the same level as the work table when the first layer of the glass is applied, then descends by one notch after each layer formation, the height of one notch corresponding to the thickness of the layer formed so that the next application of the glass is performed on a work surface located at the same level as the work table.

6. The printing device according to claim 1, wherein the object has a spatial resolution of less than one millimeter.

7. The printing device according to claim 1, wherein the laser beam is of the type of laser whose wavelength is chosen in the infrared or the UV range so that the beam is absorbed all along its path in the object.

8. The printing device according to claim 7, wherein the laser is of the CO laser type whose wavelength is between 1 and 12 µm.

9. A printing method for printing a glass object in three dimensions comprising:
   a) providing the printing device according to claim 1;
   b) checking the position of the support which must be at the same level as that of a work table;
   c) heating the support to the holding temperature, heating the first layer of the successive layers, each successive layer of the successive layers n being heated by contact with a lower layer n-1, and heating ambient air around the object by the internal regulator;
   d) applying a first layer of the glass having a non-crystalline solid state to the support by the supply mechanism;
   e) fusing the first layer of the glass by the laser under supervision of servo-control of the laser controlling power and speed of the laser in real time;
   f) descending the support by one notch;
   g) applying with the supply mechanism an additional layer of the glass over the previous layer;
   h) fusing the additional layer of the glass by the laser under supervision of the servo-control of the laser, the laser producing a beam whose wavelength results in the direct fusion of the glass having a non-crystalline solid state, in its core;
   i) descending the support by one notch;
   j) repeating the steps g) to i) until the object is completed; and
   k) cooling the object; and
   wherein the thermal regulator holds the layers of the object at a holding temperature comprised between the glass transition temperature of the glass (Tg) minus 100° C. and the softening temperature of the glass (Tr) so as to limit temperature gradients between a point of the direct fusion of the glass in its core and other points of the object, during the direct fusion and during controlled cooling of the object after its creation.

* * * * *